(12) United States Patent
Onda

(10) Patent No.: US 6,501,604 B2
(45) Date of Patent: Dec. 31, 2002

(54) LENS DRIVING APPARATUS

(75) Inventor: Kazuhiko Onda, Saitama (JP)

(73) Assignee: Fuji Photo Optical Co., Ltd., Saitama (JP)

(*) Notice: Subject to any disclaimer, the term of this patent is extended or adjusted under 35 U.S.C. 154(b) by 0 days.

(21) Appl. No.: 10/102,838

(22) Filed: Mar. 22, 2002

(65) Prior Publication Data

US 2002/0135886 A1 Sep. 26, 2002

(30) Foreign Application Priority Data

Mar. 23, 2001 (JP) ........................................ 2001-086017

(51) Int. Cl.[7] .............................. G02B 15/14; G02B 7/02
(52) U.S. Cl. ........................................ 359/696; 359/829
(58) Field of Search ................................. 359/696, 697, 359/829

(56) References Cited

U.S. PATENT DOCUMENTS

| | | | | |
|---|---|---|---|---|
| 4,008,951 A | * | 2/1977 | Himmelsbach | ............. 359/696 |
| 5,016,993 A | * | 5/1991 | Akitake | ........................ 359/696 |
| 5,377,048 A | * | 12/1994 | Tada et al. | .................... 359/694 |
| 5,391,866 A | * | 2/1995 | Hoshino et al. | ......... 250/201.2 |
| 5,815,325 A | * | 9/1998 | Johnson | ........................ 359/696 |
| 5,905,598 A | * | 5/1999 | Shimada et al. | ............. 359/694 |
| 5,966,248 A | * | 10/1999 | Kurokawa et al. | .......... 359/696 |
| 6,292,308 B1 | * | 9/2001 | Tsuzuki et al. | .............. 359/696 |
| 6,453,123 B1 | * | 9/2002 | Oshima | ....................... 348/357 |
| 6,456,444 B1 | * | 9/2002 | Yumiki et al. | ............... 359/694 |

FOREIGN PATENT DOCUMENTS

| JP | 09-096753 | 4/1997 |
|---|---|---|
| JP | 2000-275494 | 10/2000 |

* cited by examiner

*Primary Examiner*—Ricky Mack
(74) *Attorney, Agent, or Firm*—Leydig, Voit & Mayer, Ltd.

(57) ABSTRACT

The lens driving apparatus in accordance with the present invention comprises a focus motor having a lead screw; a lens holding frame meshing with the lead screw so as to be movable along an optical axis as the lead screw rotates; a nut plate meshing with the lead screw so as to be movable along the optical axis as the lead screw rotates; and urging means for urging the lens holding frame and nut plate in a direction by which they approach each other or separate from each other.

10 Claims, 6 Drawing Sheets

LENS DRIVING APPARATUS

BACKGROUND OF THE INVENTION

1. Field of the Invention

The present invention relates to a lens driving apparatus for moving a lens, such as a focus lens for carrying out focusing in particular, along an optical axis.

2. Related Background Art

FIG. 6A is an overall view of the lens driving apparatus disclosed in Japanese Patent Application Laid-Open No HEI 9-96753. This lens driving apparatus 101 comprises a driving source 102 having a lead screw 111; and a lens holding frame 103, provided with a rack part 113 in mesh with the lead screw 111, for holding a lens 110. When the driving source 102 is driven, the lens 110 is moved along the optical axis O. In this lens driving apparatus 101, the engagement between the lead screw 111 and the rack part 113 yields a backlash along the depicted optical axis O, whereby there have been cases where the movement of the lens 10 is retarded by the amount of backlash when the movement of the lens holding frame 103 is reversed, for example, which may adversely affect the positioning accuracy of the lens 110. A lens driving apparatus having a similar configuration is also disclosed in Japanese Patent Application Laid-Open No. 2000-275,194.

FIG. 6B is a sectional view of another conventional lens driving apparatus. In this lens driving apparatus 201, a lens holding frame 203 is urged along the optical axis O by a spring 220. As a consequence, the lens holding frame 203 is always biased in one direction by the amount of backlash, so that there are no "rattles," and the problem mentioned above is overcome as well.

SUMMARY OF THE INVENTION

In the conventional lens driving apparatus 201 shown in FIG. 6B, however, one end of the spring 220 is secured to a fixing end face 215, whereby the force urging the lens holding frame 203 caused by the spring 220 varies depending on positions of the lens holding frame 203. For example, the urging action caused by the spring 220 has become stronger in a position closer to the fixing end face 215. In such a case, the biasing action caused by the lens holding frame 211 with respect to the lead screw 211 becomes stronger, so that a stronger load is imposed on the rotation of the driving source 202, which may prevent the positioning of the lens 210 from being accurately controlled and lower the positioning accuracy of the lens 210.

Therefore, the object of the present invention is to provide a lens driving apparatus excellent in positional accuracy, preventing the adverse effect of rattling caused by the backlash and of excessively strong load imposed on the actuation of a driving source.

For achieving the above-mentioned object, the lens driving apparatus in accordance with the present invention is a lens driving apparatus for moving a lens along an optical axis, the lens driving apparatus comprising a lead screw rotated by a driving source; a lens holding frame for holding the lens, the lens holding frame being formed with a threaded part meshing with a threaded part of the lead screw and adapted to move along the optical axis as the lead screw rotates; a nut plate formed with a threaded part meshing with the threaded part of the lead screw and adapted to move along the optical axis as the lead screw rotates; rotation preventing means for preventing the lens holding frame and the nut plate from rotating as the lead screw rotates; and urging means for urging the lens holding frame and the nut plate in a direction by which the lens holding frame and the nut plate approach each other or separate from each other.

According to such a lens driving apparatus, the lens holding frame and nut plate are urged by the urging means in directions by which they approach each other or separate from each other, whereby each of the lens holding frame and nut plate moves by the amount of backlash generated with respect to the threaded part of the lead screw, so as to be biased at the meshing part. Therefore, positional accuracy of the lens driving apparatus is not adversely affected by rattling caused by the backlash.

Since the lens holding frame and nut plate are prevented from rotating as the lead screw rotates, the lens holding frame and nut plate move along the optical axis as the lead screw rotates, whereby the lens can accurately be moved along the optical axis.

Since each of the lens holding frame and nut plate meshes with the lead screw so as to move along the optical axis rotates while being prevented from rotating as the lead screw rotates, they move keeping the distance therebetween always constant as the lead screw rotates, whereby the urging action caused by the urging means is always held at a constant force. Therefore, the load imposed on the actuation of the driving source becomes constant, so that the rotation control of the driving source is not adversely affected, whereby the lens Preferably, at least one of the respective threaded parts of the lens holding frame and nut plate is less than one pitch. In this case, even when there is an error in each pitch width of the lead screw, no friction/load occurs due to the error upon rotating the lead screw.

Also, forming the threaded part into less than one pitch simplifies the die cutting step when molding each member. It further contributes to making the whole apparatus smaller.

Preferably, the urging means is a leaf spring. When the leaf spring is used, the urging means is formed thin, whereby the whole apparatus can be made smaller.

The lens is a focus lens for carrying out focusing in a taking optical system, for example.

DESCRIPTION OF THE PREFERRED EMBODIMENTS

In the following, the lens driving apparatus in accordance with embodiments of the present invention will be explained with reference to the drawings. In the following explanation, parts identical or equivalent to each other will be referred to with numerals or letters identical to each other without repeating their overlapping descriptions.

Figure 1:
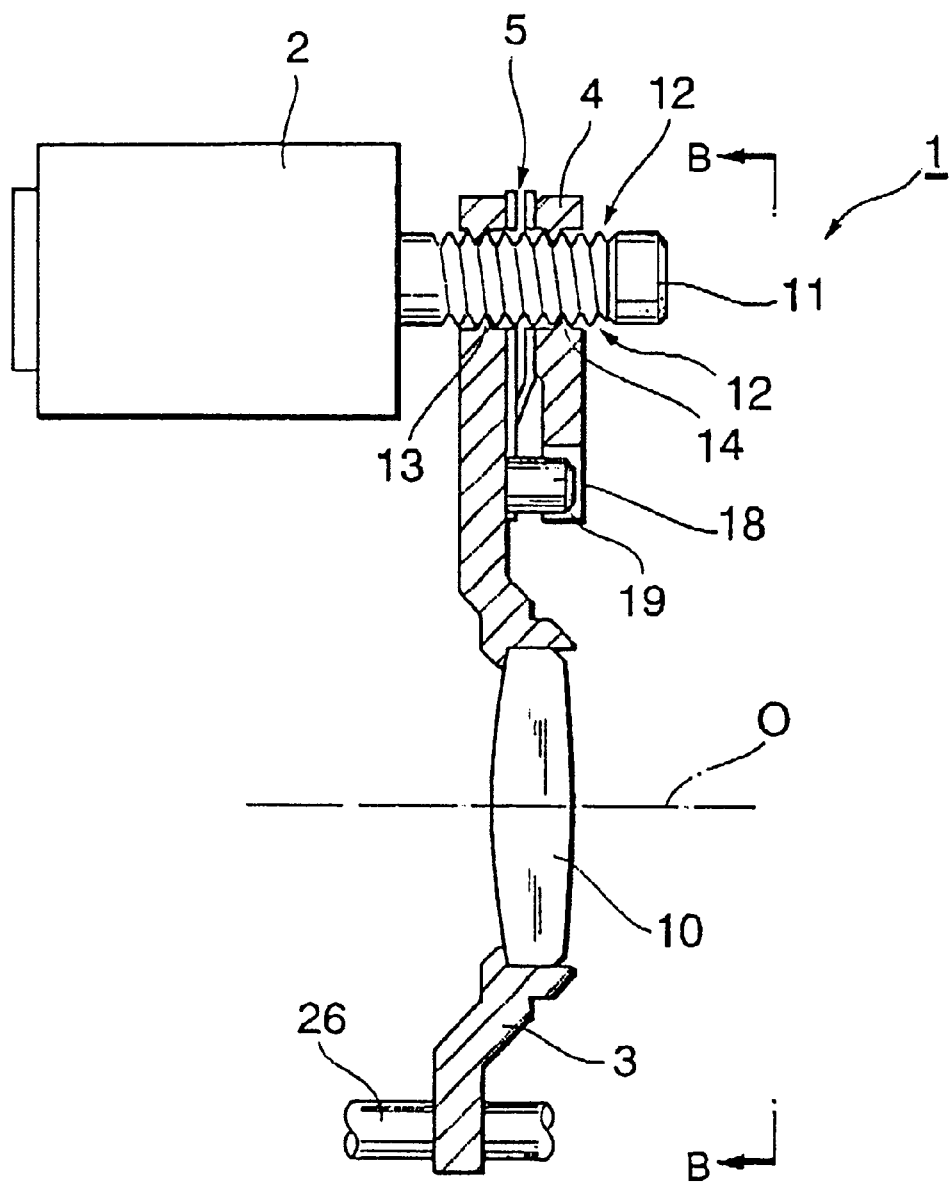
FIG. 1 is a sectional view of the lens driving apparatus in accordance with an embodiment.
Figure 2:
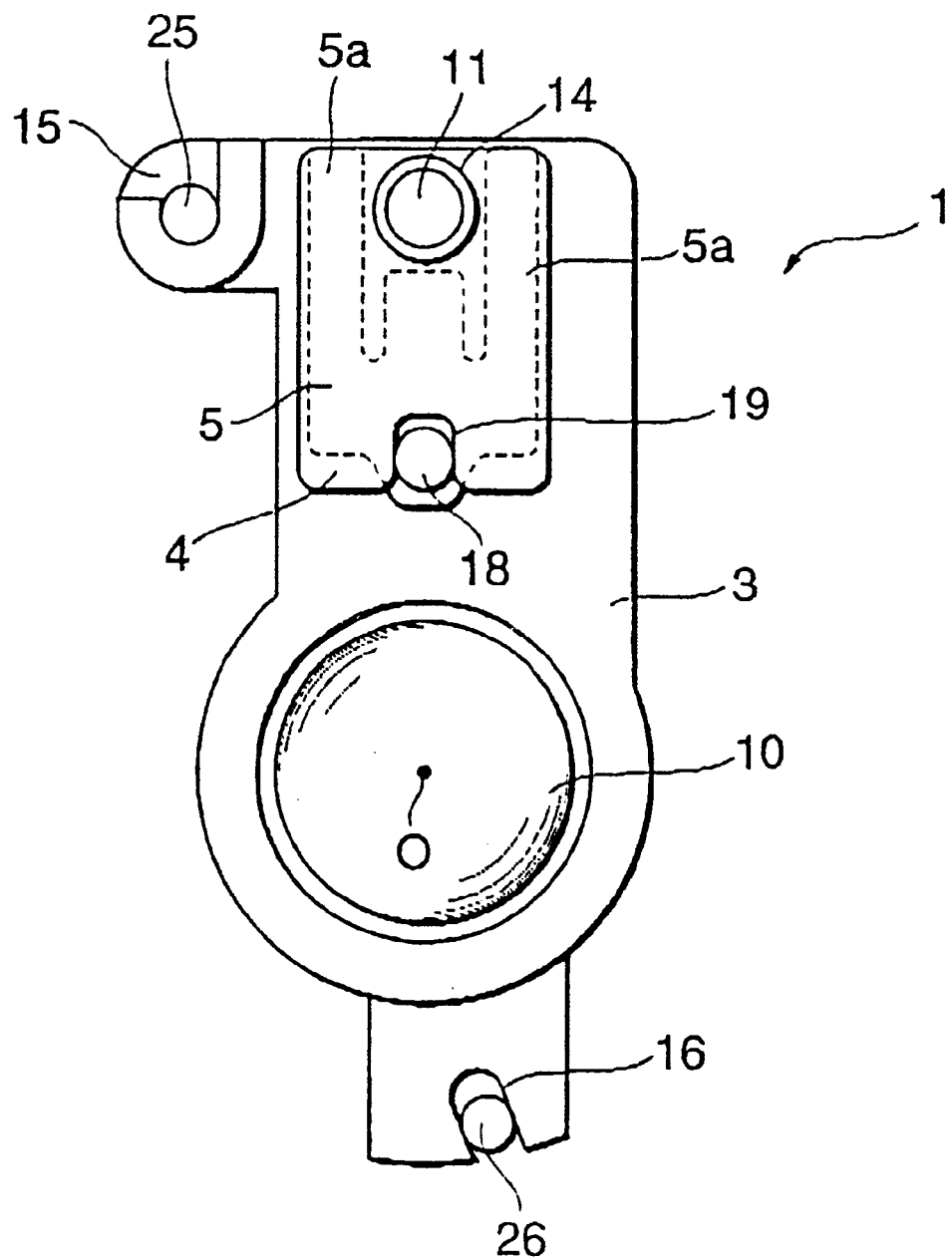
FIG. 2 is a front view of the lens driving apparatus as seen in the direction B in FIG. 1.

FIG. 1 is a sectional view of the lens driving apparatus in accordance with an embodiment. FIG. 2 is a front view of the lens driving apparatus seen in the direction B in FIG. 1. This lens driving apparatus 1 is a lens driving apparatus for moving a focus lens 10 for carrying out focusing with respect to a taking optical system along the optical axis O. The lens driving apparatus 1 comprises a focus motor 2 acting as a driving source, a lens holding frame 3 for holding the focus lens 10 and moving it along the optical axis O upon driving the focus motor 2, and a nut plate 4 and a leaf spring 5 (leaf spring 5 as urging means) for preventing the lens holding frame 3 from rattling.

The focus motor 2 has a lead screw 11 extending along the optical axis 0 with its center axis of rotation being parallel to the optical axis 0. The lens holding frame 3 and nut plate 4 have respective threaded parts 13, 14 corresponding to a threaded part 12 of the lead screw 11, and mesh with the lead screw 11 with a predetermined amount of backlash by the threaded parts 13, 14. The lens holding frame 3 and nut plate 4, which are adapted to move along the optical axis 0 as the lead screw 11 rotates, mesh with the lead screw 11 while in a state having a degree of freedom with a predetermined amount of backlash as much. Therefore, in the case where each of the lens holding frame 3, nut plate 4, and lead frame 11 varies as a product, or where the lead screw 11 and guide shafts 25, 26 for guiding and advancing/retracting the lens holding frame 3 along the optical axis 0 are not completely parallel to each other, positional deviations are absorbed by the backlash, whereby inconveniences such as increases in actuation load in meshing parts making them unmovable are prevented from occurring. Here, it is not always necessary for the threaded parts 13, 14 to be formed circularly. For example, they can be formed like letter U as long as they mesh with their corresponding grooves in the lead screw.

Each of the respective threaded parts 13, 14 of the lens holding frame 3 and nut plate 4 is set to less than one pitch. This reduces the parts meshing with each other, so that fluctuations in pitch of the lead screw 11 are absorbed, whereby friction/load is hard to occur due to errors in each pitch width of the threaded part 12 of the lead screw 11 if any. Further, since each threaded part is constructed as less than one pitch, it is not necessary for the die to be rotated in the die cutting step during the molding, whereby it is advantageous in that the manufacturing step is simplified and that the size of the lens driving apparatus 1 becomes smaller.

The leaf spring 5 is provided between the lens holding frame 3 and the nut plate 4 in the state shown in FIG. 1. The leaf spring 5 is attached to the lens holding frame 3, and urges the members 3, 4 in directions by which they are separated from each other. This prevents the lens holding frame 3 from rattling as the lead screw 11 rotates. The urging action of the leaf spring 5 will be explained later in detail. In this example, the leaf spring 5 has two spring parts 5a holding the lead screw 11 therebetween as shown in FIG. 2. Preferably, the urging action caused by the leaf spring 5 is formed such that forces are imposed on the lens holding frame 3 and the nut plate 4 uniformly around the lead screw 11.

Also, the lens driving apparatus 1 is provided with the first guide shaft 25 and second guide shaft 26 extending along the optical axis O, whereas the lens holding frame 3 is formed with a first guide shaft receiving part 15 and a second guide shaft receiving part 16 for receiving the guide shafts 25, 26, respectively. As a consequence, the lens holding frame 3 is guided along the optical axis O and is prevented from rotating as the lead screw 11 rotates (i.e., the first and second guide shafts 25, 26, and the first and second guide shaft receiving parts 15, 16 function as rotation preventing means for preventing the lens holding frame 3 from rotating). The guide shaft receiving parts 15, 16 are formed like a hole and letter U, respectively.

Also, the lens holding frame 3 is formed with a boss 18 projecting along the optical axis O, whereas the nut-plate 4 is formed with a boss receiving part 19 for receiving the boss 18. As a consequence, the nut plate 4 is prevented from rotating with respect to the lens holding frame 3 as the lead screw 11 rotates (i.e., the boss 18 and boss receiving part 19 function as rotation preventing means for preventing the nut plate 4 from rotating).

As explained above, the lens holding frame 3 and nut plate 4 mesh with the lead screw 11 with a predetermined amount of backlash, whereby a gap exists in their meshing parts with respect to the lead screw 11 in the state where no leaf spring 5 is interposed and whereby they are not urged in directions by which they are separated from each other. In the lens driving apparatus 1 in accordance with this embodiment, however, the lens holding frame 3 and nut plate 4 are urged by the leaf spring 5 in directions by which they are separated from each other, whereby they are kept biased to oblique surfaces of the groove of the lead screw 11 (see FIG. 3).

Figure 3:
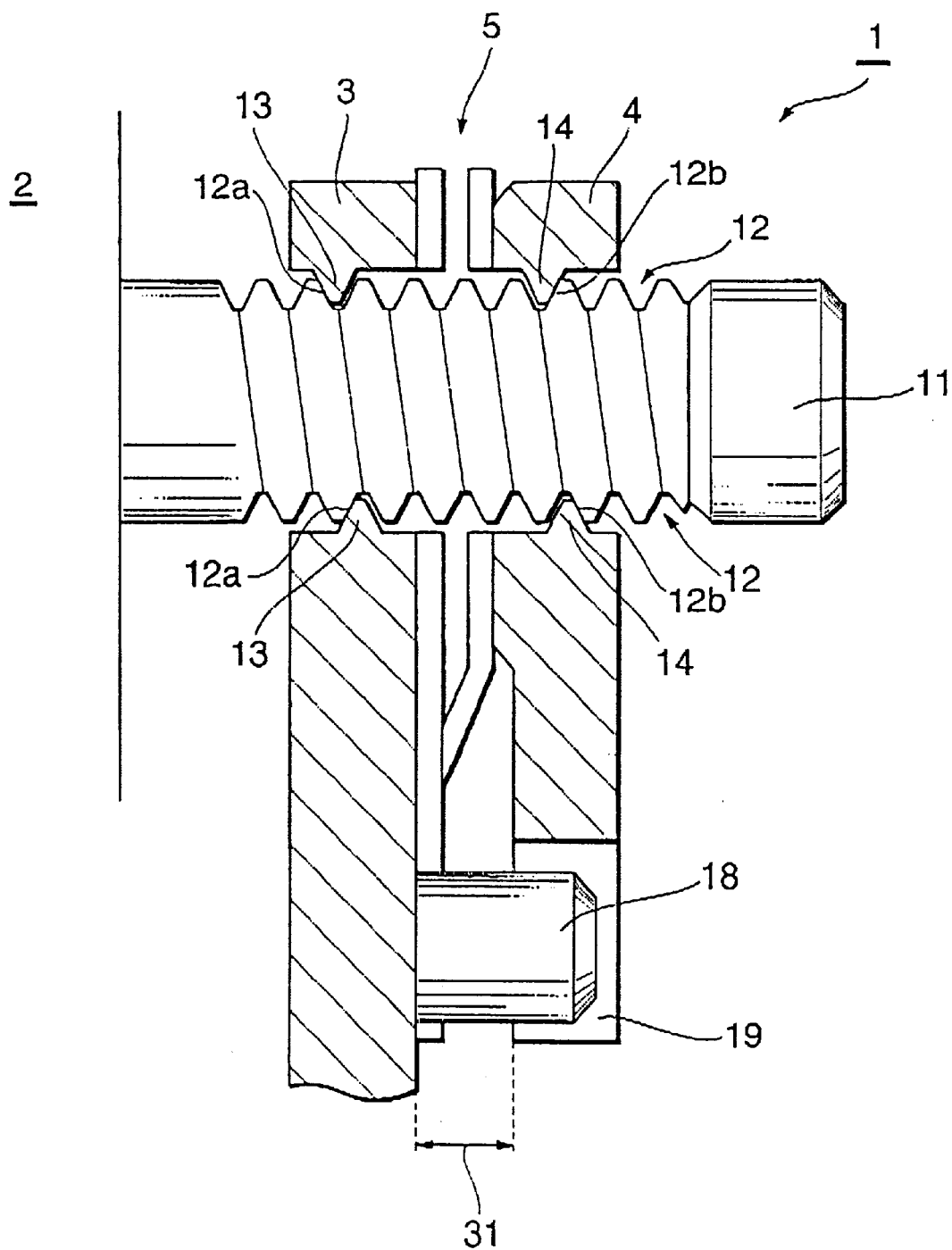
FIG. 3 is a view enlarging a lead screw and its surroundings.

FIG. 3 is an enlarged view of the lead screw and its surroundings. The lens holding frame 3 and the nut plate 4 mesh with the lead screw 11 with a predetermined amount of backlash, whereas the leaf spring 5 disposed between these members 3, 4 urges the lens holding frame 3 and nut plate 4 in directions by which they are separated from each other. As a consequence, the lens holding frame 3 and nut plate 4 move within the groove of the threaded part 12 by the amount of backlash, thereby being biased in respective directions different from each other. Namely, as FIG. 3 plainly indicates, the oblique surface of the threaded part 13 of the holding frame 3 abuts against an oblique surface 12a of the threaded part 12 of the lead screw 11, whereas the threaded part 14 of the nut plate 4 abuts against an oblique surface 12b of the threaded part 12 of the lead screw 11, and this condition is held by the urging action of the leaf spring 5.

In the lens driving apparatus 1 in accordance with this embodiment, thus biased state is always held during when the focus motor 2 rotates as well. As a consequence, upon rotating the focus motor 2 (when the direction of rotation changes or the like), the threaded part 13 of the lens holding frame 3 is prevented from moving within the groove of the threaded part 12 of the lead screw 11 by the amount of backlash and thereby rattling or shifting is prevented. Though there have been cases where this rattling adversely affects the positioning accuracy in the conventional lens driving apparatus, such inconveniences are eliminated in the lens driving apparatus 1 in accordance with this embodiment.

Further, since the lens driving apparatus 1 is configured such that the lens holding frame 3 and nut plate 4 are prevented from rotating relative to each other by the boss 18 and the boss receiving part 19 and are urged by the leaf spring 5 in directions by which they are separated from each other, the distance 31 therebetween is always kept constant as the lead screw 11 rotates. As a consequence, the urging action of the leaf spring 5, which acts so as to separate the lens holding frame 3 and the nut plate 4 from each other, is always held at a constant force.

If the distance 31 is remarkably shortened upon rotating the lead screw 11, so that the urging action caused by the urging means 5 increases, the frictional force between the oblique surface 12a of the threaded part 12 of the lead screw 11 and the threaded part 13 of the lens holding frame 3 will increase, thereby enhancing the load imparted to the driving and rotating of the focus motor 2. When the load on the focus motor 2 increases, the rotation control of the focus motor 2 is adversely affected, which may cause the positioning accuracy with respect to the lens 10 to deteriorate. In the lens driving apparatus 1 in accordance with this embodiment, the urging action is held at a constant force as mentioned above, whereby the load on the focus motor 2 becomes constant. As a consequence, the rotation of focus-motor 2 can accurately be controlled, whereby the lens 10 can be positioned precisely.

Figure 4:
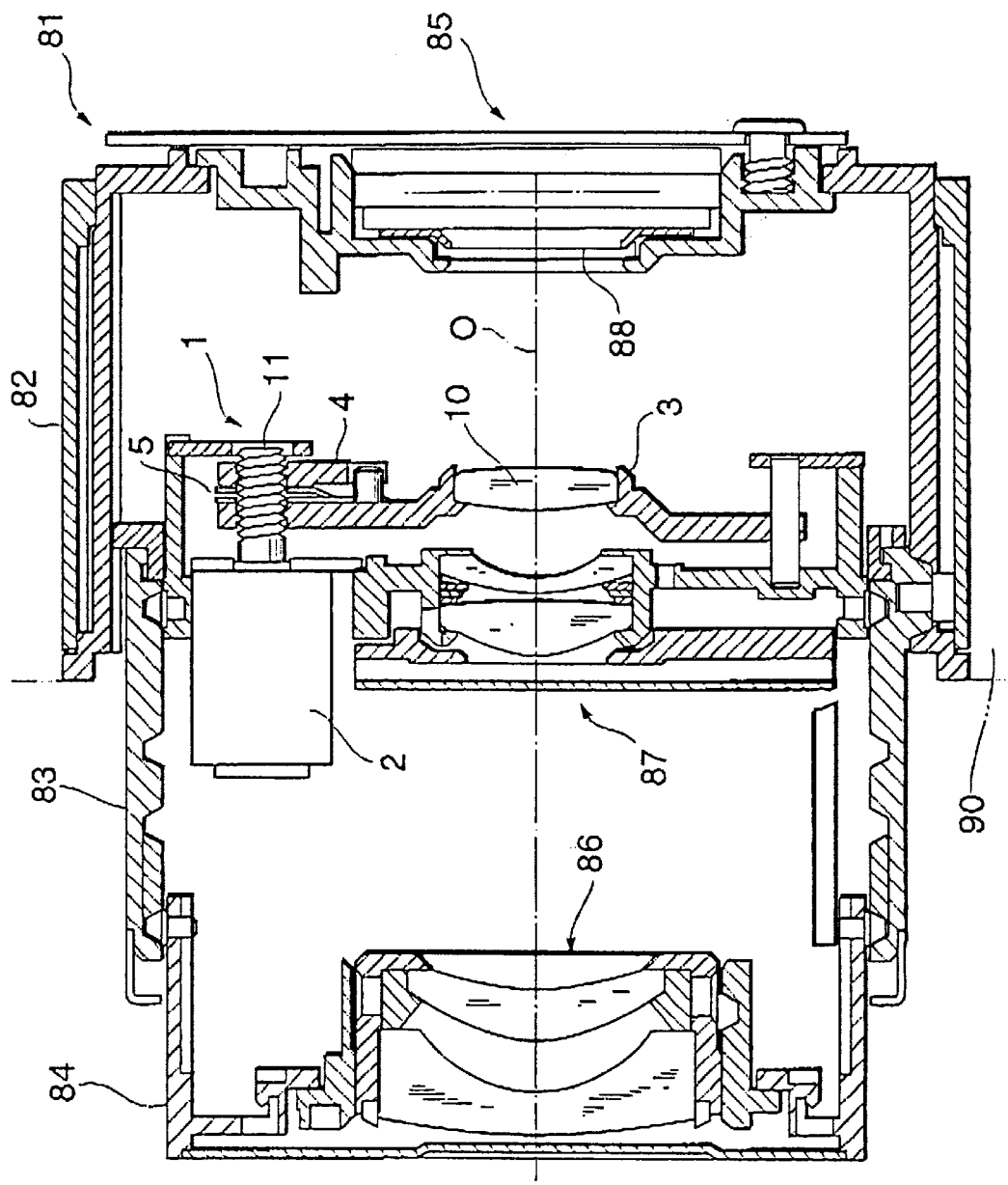
FIG. 4 is a sectional view of a lens barrel in which the lens driving apparatus in accordance with the embodiment file is incorporated.

FIG. 4 is a sectional view of a lens barrel in which the lens driving apparatus in accordance with this embodiment is incorporated. This lens barrel 81 comprises a fixed cylinder 82 to which a CCD (Charged Coupled Device) 85 for carrying out photoelectric conversion is attached, an intermediate cylinder 83 in which a second lens group 87 and the focus lens 10 are placed, and a movable cylinder 84 in which a first lens group 86 is placed. The cylinders 83, 84 are expandable along the optical axis O in a multistage fashion, whereby a zooming function is realized. Optical information captured by way of the lens groups 86, 87 is received by a light-receiving surface 88, and is converted into an electric signal by the CCD 85, whereby an electric signal pattern is formed. The lens barrel 81 is attached to a digital camera body 90. An image formed by the electric signal pattern can be seen through a monitor placed in the digital camera body 90 and the like.

The lens driving apparatus 1 in accordance with this embodiment is placed behind the second lens group 87, and moves the focus lens 10 to an appropriate position along the optical axis O, so as to carry out focusing in this taking optical system. Such a taking optical system is one in which several millions of pixels of data are concentrated on the light-receiving surface having a diameter of about 1 cm, whereby the fine positioning accuracy of the focus lens 10 may greatly affect the resulting image quality. As mentioned above, the lens driving apparatus 1 in accordance with this embodiment can accurately position the focus lens 10, thus making it possible to carry out focusing accurately in the lens barrel 81.

Figure 5:
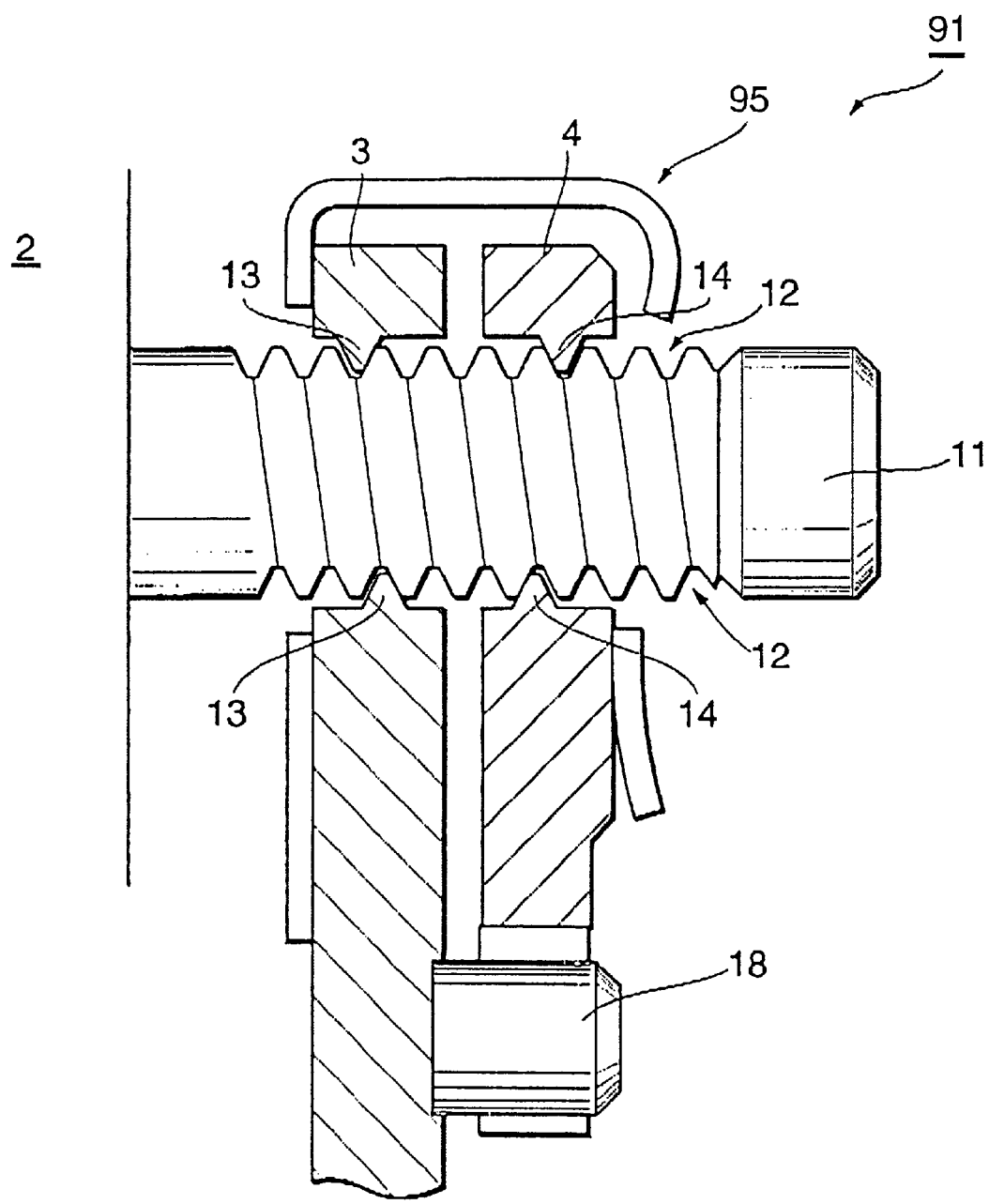
FIG. 5 is a view enlarging a lead screw and its surroundings in the lens driving apparatus in accordance with another embodiment.
Figure 6A:
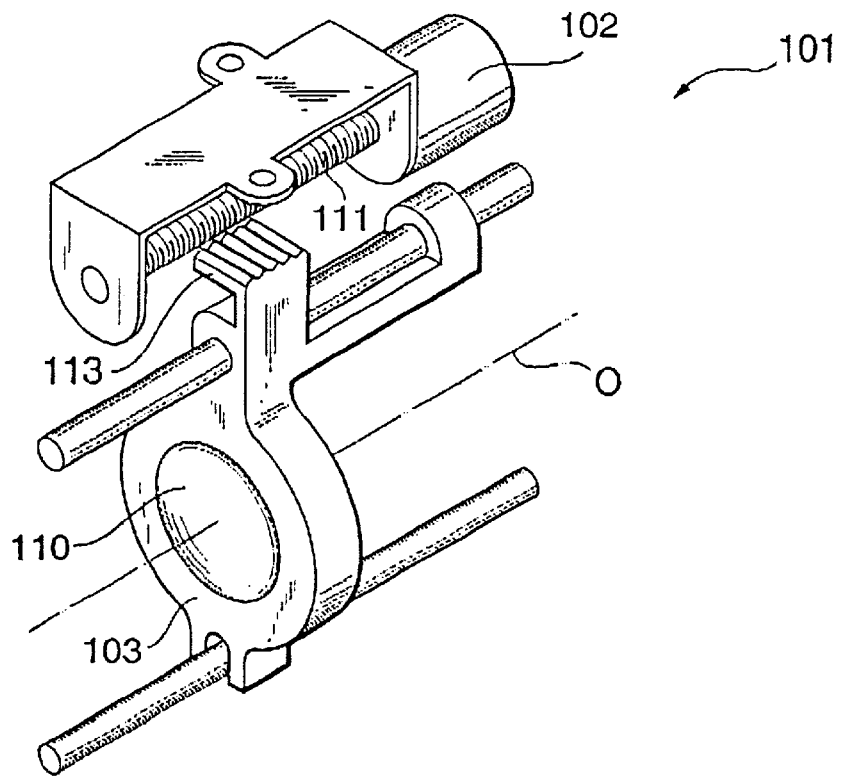
FIGS. 6A and 6B are views showing conventional lens driving apparatus, respectively.
Figure 6B:
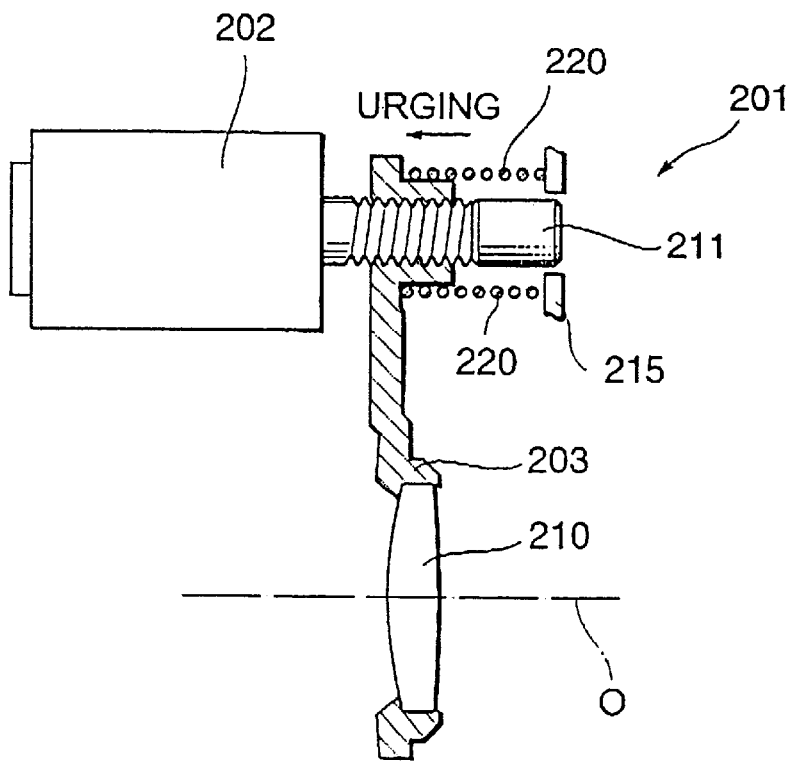

FIG. 5 is an enlarged view of the lead screw and its surroundings in the lens driving apparatus in accordance with another embodiment. A leaf spring 95 provided so as to surround a lens holding frame 3 and a nut plate 4 urges the lens holding frame 3 and nut plate 4 in directions by which they approach each other. This holds the state where the lens holding frame 3 and nut plate 4 are moved within the groove of the threaded part 12 by the amount of backlash and are biased in respective directions different from each other.

As in the lens driving apparatus 1, the biased state is always held in the lens driving apparatus 91 in accordance with this embodiment during when the focus motor 2 rotates as well, whereby the threaded part 13 of the lens holding frame 3 is prevented from moving within the groove of the threaded part 12 of the lead screw 11 by the amount of backlash and thereby rattling or shifting when the focus motor 2 rotates (upon changing the rotating direction and the like) is prevented. Hence, the positioning accuracy is prevented from being adversely affected by the backlash. Also, due to a same reason as in the lens driving apparatus 1, the urging action caused by the leaf spring 95 and its resulting load always act constantly, whereby the rotating control of the focus motor 2 is prevented from being adversely affected.

Though the present invention is specifically explained according to its embodiments in the foregoing, the present invention is not limited to the above-mentioned embodiments when being carried out, but includes all the modifications of the invention falling within the scope of claims of the present invention, and can be modified in terms of its form, size, arrangement, configuration, and the like.

For example, though an example in which the lens driving apparatus 1 is applied to a digital camera body is shown, it is also applicable to lens optical systems of cameras for taking photographs by using silver halide films and other optical devices.

What is claimed is:

1. A lens driving apparatus for moving a lens along an optical axis, said lens driving apparatus comprising:
   a lead screw rotated by a driving source;
   a lens holding frame for holding said lens, said lens holding frame having a threaded part meshing with a threaded part of said lead screw and adapted to move along said optical axis as said lead screw rotates;
   a nut plate formed with a threaded part meshing with said threaded part of said lead screw and adapted to move along said optical axis as said lead screw rotates;
   rotation preventing means for preventing said lens holding frame and said nut plate from rotating as said lead screw rotates; and
   urging means for urging said lens holding frame and said nut plate in a direction by which said lens holding frame and said nut plate separate from each other.

2. The lens driving apparatus according to claim 1, wherein said threaded part of said lens holding frame is one pitch or less.

3. The lens driving apparatus according to claim 1, wherein said threaded part of said nut plate is one pitch or less.

4. The lens driving apparatus according to claim 1, wherein said urging means is a leaf spring.

5. The lens driving apparatus according to claim 1, wherein said lens is a focus lens for focusing in a taking optical system.

6. A lens driving apparatus for moving a lens along an optical axis, said lens driving apparatus comprising:
   a lead screw rotated by a driving source;
   a lens holding frame for holding said lens, said lens holding frame having a threaded part meshing with a threaded part of said lead screw and adapted to move along said optical axis as said lead screw rotates;
   a nut plate formed with a threaded part meshing with said threaded part of said lead screw and adapted to move along said optical axis as said lead screw rotates;
   rotation preventing means for preventing said lens holding frame and said nut plate from rotating as said lead screw rotates; and
   urging means for urging said lens holding frame and said nut plate in a direction by which said lens holding frame and said nut plate approach each other.

7. The lens driving apparatus according to claim 6, wherein said threaded part of said lens holding frame is one pitch or less.

8. The lens driving apparatus according to claim 6, wherein said threaded part of said nut plate is one pitch or less.

9. The lens driving apparatus according to claim 6, wherein said urging means is a leaf spring.

10. The lens driving apparatus according to claim 6, wherein said lens is a focus lens for focusing in a taking optical system.

* * * * *